United States Patent
Nabar et al.

(10) Patent No.: US 12,124,700 B2
(45) Date of Patent: Oct. 22, 2024

(54) LOADING MULTI-SEGMENTED SOFTWARE IMAGE FILES INTO MEMORY USING A NESTED FILE STRUCTURE

(71) Applicant: QUALCOMM INCORPORATED, San Diego, CA (US)

(72) Inventors: Anushka Mihir Nabar, Hyderabad (IN); Arun Gothekar, Hyderabad (IN); Kishore Batta, Visakhapatnam (IN); Romil Jain, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/952,029

(22) Filed: Sep. 23, 2022

(65) Prior Publication Data

US 2024/0103725 A1    Mar. 28, 2024

(51) Int. Cl.
*G06F 12/00*    (2006.01)
*G06F 3/06*     (2006.01)
*G06F 13/00*    (2006.01)

(52) U.S. Cl.
CPC ............ *G06F 3/061* (2013.01); *G06F 3/0659* (2013.01); *G06F 3/0679* (2013.01)

(58) Field of Classification Search
CPC ....... G06F 3/061; G06F 3/0659; G06F 3/0679
USPC ......................................................... 711/154
See application file for complete search history.

(56) References Cited

U.S. PATENT DOCUMENTS

| | | | | |
|---|---|---|---|---|
| 5,544,356 A | * | 8/1996 | Robinson ............. | G11C 16/349 365/185.11 |
| 5,630,067 A | * | 5/1997 | Kindell ................. | G06F 9/5011 725/74 |
| 5,630,093 A | * | 5/1997 | Holzhammer ........ | G06F 3/0601 711/115 |
| 6,038,636 A | * | 3/2000 | Brown, III ............ | G06F 3/0679 711/170 |
| 6,612,490 B1 | * | 9/2003 | Herrendoerfer ............................. | G06Q 20/35765 235/382 |
| 6,694,393 B1 | * | 2/2004 | Sutter, Jr. ................ | G06F 9/445 711/134 |

(Continued)

OTHER PUBLICATIONS

Related PCT Pat. App. Ser. No. PCT/US2023/029233, filed Aug. 1, 2023, entitled, Loading Multi-Segmented Software Image Files Into Memory Using a Nested File Structure, International Search Report and the Written Opinion of the ISA (EPO), transmitted Dec. 6, 2023, 11Pages.

*Primary Examiner* — Sheng Jen Tsai
(74) *Attorney, Agent, or Firm* — Smith Tempel Blaha LLC/Qualcomm

(57) ABSTRACT

Data may be loaded in a computing device from a non-volatile storage medium using files having a nested structure. An outer file metadata portion may be read from an outer file on the storage medium into RAM. The outer file may include the outer file metadata portion and an outer file data portion. The outer file data portion may then be read from the outer file on the storage medium into the RAM based on the outer file metadata portion. The outer file data portion may be an inner file. The inner file may include an inner file metadata portion and an inner file data portion. Then, the inner file metadata portion may be read from the inner file in the RAM. The inner file data portion may be read from the inner file in the RAM based on the inner file metadata portion.

16 Claims, 6 Drawing Sheets

(56) References Cited

U.S. PATENT DOCUMENTS

| | | | | |
|---|---|---|---|---|
| 7,397,959 B1* | 7/2008 | Volkoff | | H03M 7/30 382/209 |
| 7,565,452 B2* | 7/2009 | Freiburg | | G11B 27/105 709/231 |
| 7,571,152 B2* | 8/2009 | Thienot | | H03M 7/30 |
| 7,620,658 B2* | 11/2009 | Benson | | H04L 61/4552 707/999.102 |
| 11,620,473 B1* | 4/2023 | Zhang | | G06F 18/213 382/159 |
| 2002/0095546 A1* | 7/2002 | Dimitri | | G11B 20/1217 711/112 |
| 2002/0116651 A1* | 8/2002 | Beckert | | G06F 1/3225 711/159 |
| 2003/0055657 A1* | 3/2003 | Yoshida | | H03M 7/30 |
| 2003/0145310 A1* | 7/2003 | Thames | | G06F 8/73 715/205 |
| 2003/0149701 A1* | 8/2003 | Vicars-Harris | | H04N 19/61 375/E7.137 |
| 2005/0065977 A1* | 3/2005 | Benson | | G06F 16/27 |
| 2005/0177626 A1* | 8/2005 | Freiburg | | G11B 27/105 709/219 |
| 2005/0188369 A1* | 8/2005 | Evers | | G06F 8/60 717/174 |
| 2006/0092785 A1* | 5/2006 | Takashima | | G11B 27/329 369/47.1 |
| 2006/0092794 A1* | 5/2006 | Takashima | | G11B 27/329 369/53.2 |
| 2006/0140144 A1* | 6/2006 | Bruner | | H04L 9/40 370/328 |
| 2007/0043741 A1* | 2/2007 | Rydzewski | | B42F 13/0033 |
| 2008/0098157 A1* | 4/2008 | Andrewartha | | G06F 12/0804 711/E12.04 |
| 2009/0003154 A1* | 1/2009 | Usui | | G11B 27/034 369/47.1 |
| 2009/0092014 A1* | 4/2009 | Tanaka | | G11B 20/1217 369/47.14 |
| 2009/0116349 A1* | 5/2009 | Takashima | | G11B 27/105 |
| 2010/0153739 A1* | 6/2010 | Guymon, Jr. | | G06F 21/6209 713/176 |
| 2010/0262638 A1* | 10/2010 | Fitzgerald | | G06F 9/4401 707/822 |
| 2012/0110632 A1* | 5/2012 | Burghart | | G06F 21/6218 726/1 |
| 2012/0290870 A1* | 11/2012 | Shah | | G06F 21/575 714/E11.073 |
| 2015/0278246 A1* | 10/2015 | Toyama | | G06F 3/0643 707/622 |
| 2015/0326567 A1* | 11/2015 | Hamburg | | G06F 21/602 713/155 |
| 2016/0359923 A1* | 12/2016 | Chen | | G06N 20/00 |
| 2017/0116007 A1* | 4/2017 | Cimadamore | | G06F 9/44557 |
| 2019/0065752 A1 | 2/2019 | Li et al. | | |
| 2021/0318862 A1* | 10/2021 | Subramanian | | G06F 8/71 |
| 2022/0164445 A1* | 5/2022 | Poleg | | G06F 16/14 |
| 2022/0398076 A1* | 12/2022 | Witowski | | G06F 8/54 |

\* cited by examiner

LOADING MULTI-SEGMENTED SOFTWARE IMAGE FILES INTO MEMORY USING A NESTED FILE STRUCTURE

DESCRIPTION OF THE RELATED ART

Booting a computing device may include reading one or more files from a disk, flash memory, or other non-volatile storage medium and loading those files into random access memory ("RAM"). A software component known as a bootloader may control this reading and loading of files as part of the booting process. A fast boot time may enhance the user experience or provide other advantages. For such reasons, it is generally desirable to minimize the amount of time required to load files into RAM during booting.

Executable files stored on the non-volatile boot medium may be referred to as images, executable images, software images, binary images, etc. The term "image" is sometimes used to refer to binary information without regard to its structure or format. For example, copying an image from a source to a destination may refer to making a bit-identical copy of the information. An executable image may have a standardized format, such as the Executable and Linkable Format ("ELF"). An ELF image includes some number of individual ELF segments, which may include an ELF File Header, an ELF Program Header, and some number of loadable ELF data segments.

A bootloader may first read the ELF File Header stored on the boot medium. Reading the ELF File Header provides the bootloader with the location of the ELF Program Header in the ELF image. The bootloader may then read the ELF Program Header from that location in the ELF image. The ELF Program Header provides the bootloader with the locations of various loadable data segments in the ELF image. The bootloader may then read the ELF data segments from those locations in the ELF image. Each access of the boot medium by the bootloader takes some amount of time. The total amount of time is related to the number of accesses of the boot medium. This total amount of time may be substantial when many accesses are required, such as when the data segments are unaligned or non-contiguous.

SUMMARY OF THE DISCLOSURE

Systems, methods, computer-readable media, and other examples are disclosed for loading data in a computing device from a non-volatile storage medium.

An exemplary method for loading data in a computing device from a non-volatile storage medium may include reading, by a processor, an outer file metadata portion from an outer file on the storage medium into random access memory ("RAM"). The outer file may include the outer file metadata portion and an outer file data portion. The method may further include reading, by the processor, the outer file data portion from the outer file on the storage medium into the RAM based on the outer file metadata portion. The outer file data portion may comprise an inner file. The inner file may include an inner file metadata portion and an inner file data portion. The method may also include reading, by the processor, the inner file metadata portion from the inner file in the RAM. The method may still further include reading, by the processor, the inner file data portion from the inner file in the RAM based on the inner file metadata portion.

An exemplary system for loading data in a computing device from a non-volatile storage medium may include a non-volatile storage medium, a RAM, and a processor. The processor may be configured to read an outer file metadata portion from an outer file on the storage medium into RAM. The outer file may include the outer file metadata portion and an outer file data portion. The processor may further be configured to read the outer file data portion from the outer file on the storage medium into the RAM based on the outer file metadata portion. The outer file data portion may comprise an inner file. The inner file may include an inner file metadata portion and an inner file data portion. The processor may also be configured to read the inner file metadata portion from the inner file in the RAM. The processor may still further be configured to read the inner file data portion from the inner file in the RAM based on the inner file metadata portion.

Another exemplary system for loading data in a computing device from a non-volatile storage medium may include means for reading an outer file metadata portion from an outer file on the storage medium into RAM. The outer file may include the outer file metadata portion and an outer file data portion. The system may further include means for reading the outer file data portion from the outer file on the storage medium into the RAM based on the outer file metadata portion. The outer file data portion may comprise an inner file. The inner file may include an inner file metadata portion and an inner file data portion. The system may also include means for reading the inner file metadata portion from the inner file in the RAM. The system may still further include means for reading the inner file data portion from the inner file in the RAM based on the inner file metadata portion.

An exemplary computer-readable medium for loading data in a computing device from a non-volatile storage medium may include a non-transitory computer-readable medium having instructions stored thereon in computer-executable form. The instructions, when executed by a processing system of the computing device, may configure the processing system to read an outer file metadata portion from an outer file on the storage medium into RAM. The outer file may include the outer file metadata portion and an outer file data portion. The instructions, when executed by the processing system, may further configure the processing system to read the outer file data portion from the outer file on the storage medium into the RAM based on the outer file metadata portion. The outer file data portion may comprise an inner file. The inner file may include an inner file metadata portion and an inner file data portion. The instructions, when executed, may also configure the processing system to read the inner file metadata portion from the inner file in the RAM. The instructions, when executed by the processing system, may still further configure the processing system to read the inner file data portion from the inner file in the RAM based on the inner file metadata portion.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
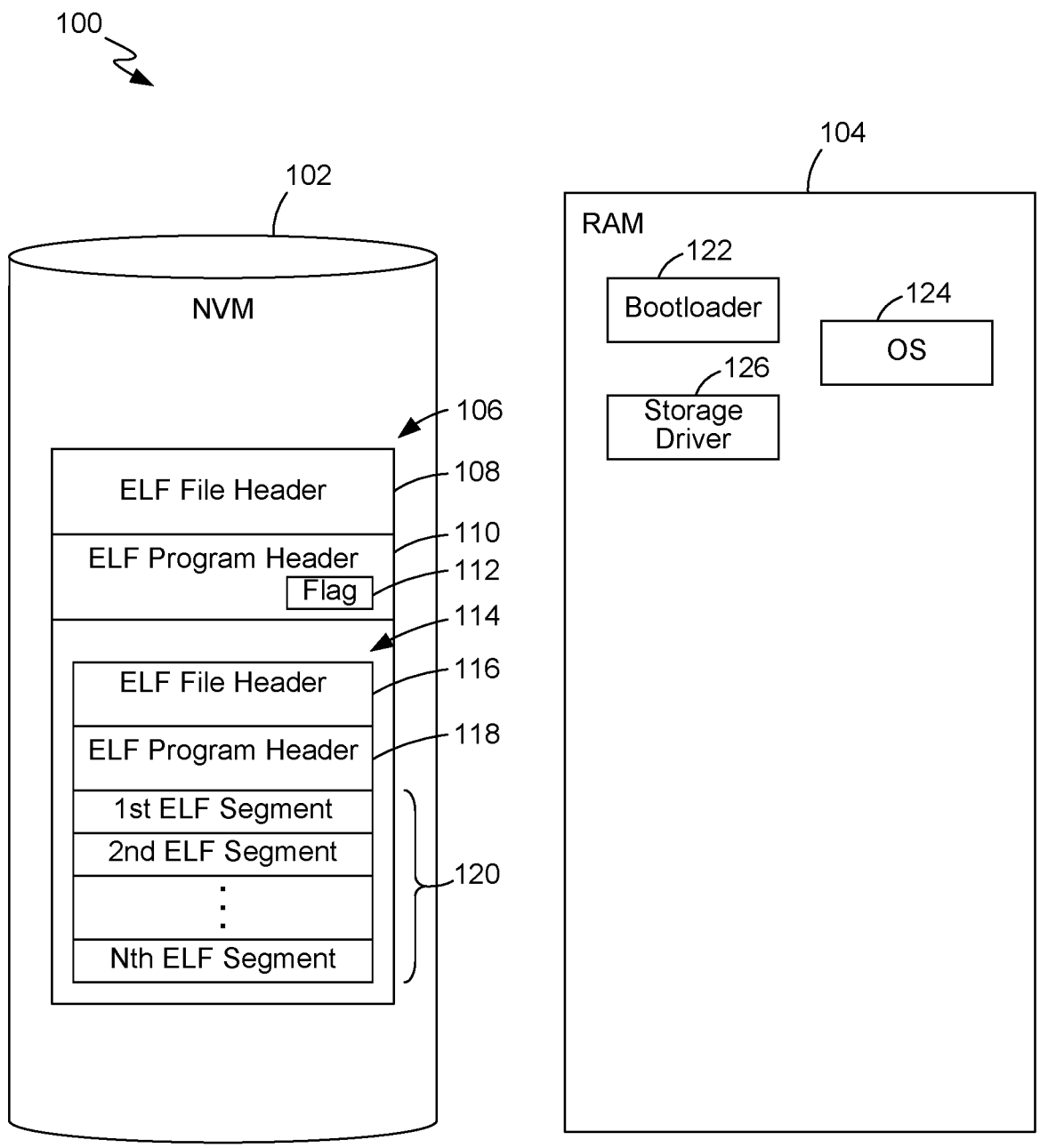
FIG. 1 is a block diagram of a system having a non-volatile storage medium and a random access memory ("RAM"), in accordance with exemplary embodiments.

As shown in FIG. 1, in an illustrative or exemplary embodiment a system 100 for loading data during booting of a computing device (not shown in FIG. 1) or at other times may include a non-volatile storage medium ("NVM") 102 and a random access memory ("RAM") 104. The "data" that is loaded may be of any type, including executable images. The NVM 102 may be of any type, such as flash memory, disk memory, etc. The RAM 104 may be of any type, such as dynamic RAM, static RAM, etc.

Data stored on the NVM 102 may include an outer file 106. The outer file 106 may be of any type, such as an executable file (i.e., a file having one or more portions that are executable). The outer file 106 may have any format, such as a standardized format that may be known to one of ordinary skill in the art as Executable Linkable Format ("ELF"). The outer file 106 may include one or more metadata portions, such as an outer file ELF File Header 108 and an outer file ELF Program Header 110. In accordance with a feature described below, a metadata portion, such as the outer file ELF Program Header 110, may include a flag 112. As understood by one of ordinary skill in the art, an ELF file may include one or more data portions or segments in addition to the outer file ELF File Header 108 and the outer file ELF Program Header 110 (metadata portions). In the illustrated example, the outer file 106 may have only one such data segment, which may be referred to as the inner file 114. The inner file 114 may, like the outer file 106, be an ELF file. Accordingly, the inner file 114 may include an inner file ELF File Header 116 and an inner file ELF Program Header 118. The outer file 106 and inner file 114 together may be referred to as a nested ELF file or an ELF-in-ELF file.

In addition to the inner file ELF File Header 116 and the inner file ELF Program Header 118 (metadata portions), the inner file 114 may include any number N of inner file ELF data segments 120. The number of inner file ELF data segments 120 may be large in some examples, such as on the order of hundreds or thousands, but is at least two. Note that in the illustrated example the outer file 106 is an ELF file having only one ELF data segment, which is the inner file 114, while the inner file 114 is an ELF file having at least two (but in some examples, a larger number of) ELF data segments 120.

Stored or residing in the RAM 104 (or other memory from which software may be executed) may be various executable software components, such as a bootloader 122, an operating system 124, a storage driver 126, etc. Although these software components are distinct in the illustrated example for purposes of clarity, in other examples some of these components, or portions thereof, may be combined with each other or with still other software components. Also, in the example described below some actions are performed by or controlled by the bootloader 122, while other actions are performed by or controlled by the operating system 124. Nevertheless, in other examples different actions may be performed by different combinations of the bootloader 122 and operating system 124. In still other examples, the bootloader 122 by itself may perform or control all of the described actions, or alternatively, the operating system 124 by itself may perform or control all of the described actions. It should be noted that the terms "stored on" and "stored in" may be used synonymously herein.

Figure 2:
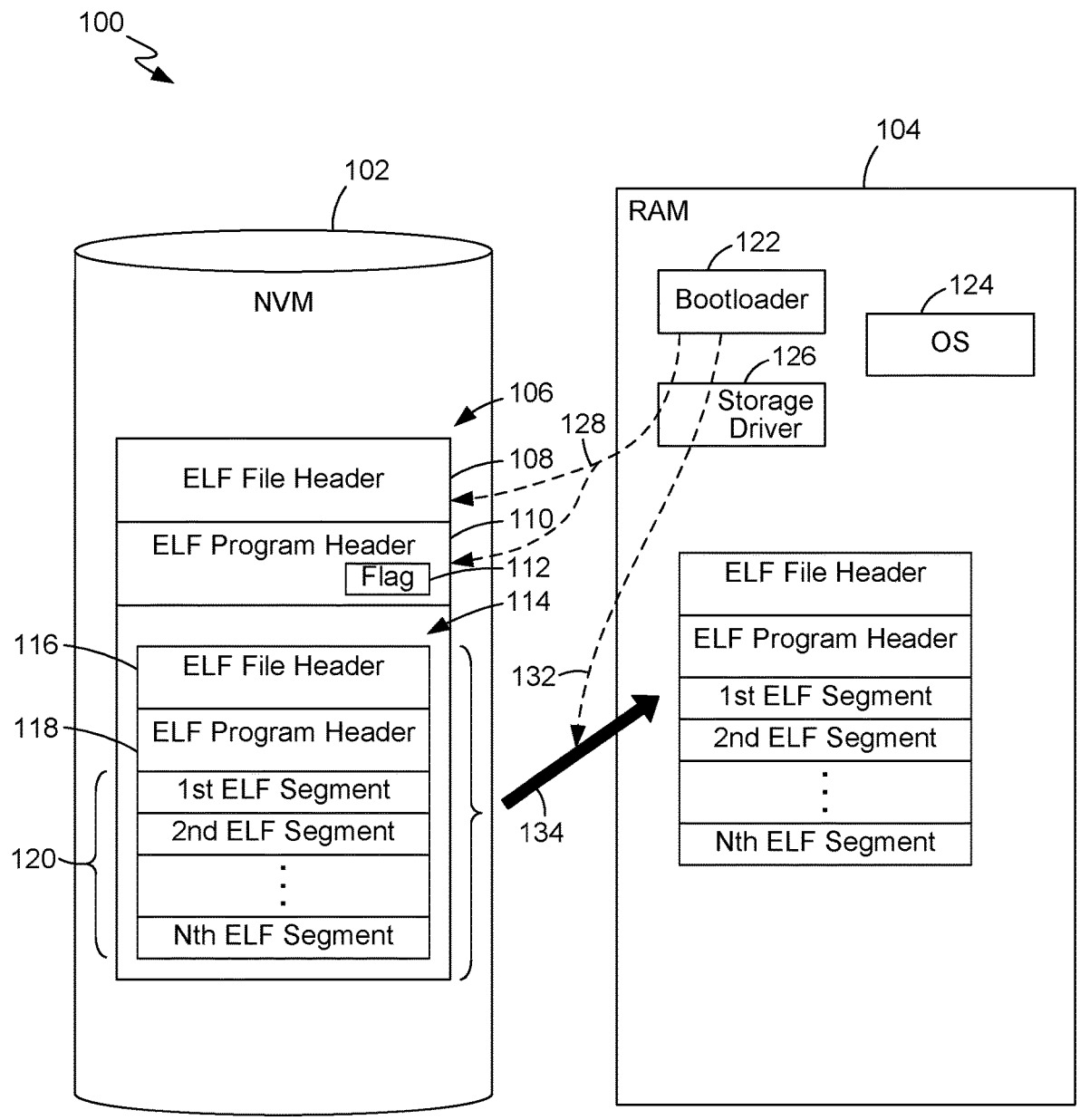
FIG. 2 is similar to FIG. 1, showing the system after file portions have been transferred from the non-volatile storage medium to the RAM, in accordance with exemplary embodiments.

As shown in FIG. 2, the bootloader 122 may be configured to read the outer file ELF File Header 108 and the outer file EFL Program Header 110. The bootloader 122 may be configured to read the outer file ELF File Header 108 and the outer file ELF Program Header 110 together in a single read operation or access of the NVM 102. In reading the outer file ELF File Header 108 and the outer ELF Program Header 110, the bootloader 122 may use the storage driver 126 to access the NVM 102. This access of the NVM 102 by the bootloader is conceptually indicated by the broken-line arrow 128. Alternatively, the bootloader 122 may be configured to first read the outer file ELF File Header 108 in a first access of the NVM 102 and then read the outer file ELF Program Header 110 in a second access of the NVM 102. This alternative may be useful in an example in which the outer file ELF File Header 108 includes information identifying the location of the outer file ELF Program Header 110 in the outer file 106. In such an example, the bootloader 122 may be configured to use this location information to read the outer file ELF Program Header 110.

The outer file ELF Program Header 110 may include information identifying the location of the outer file ELF data segment in the outer file 106. In the illustrated example there is only one outer file ELF data segment: the inner file 114. The bootloader 122 may be configured to use this location information to read the inner file 114. In reading the inner file 114, the bootloader 122 may use the storage driver 126 to access the NVM 102. This access of the NVM 102 by the bootloader 122 is conceptually indicated by the broken-line arrow 132. The bootloader 122 may be configured to read or transfer the inner file 114 from the NVM 102 to the RAM 104, as indicated by the arrow 134.

Figure 3:
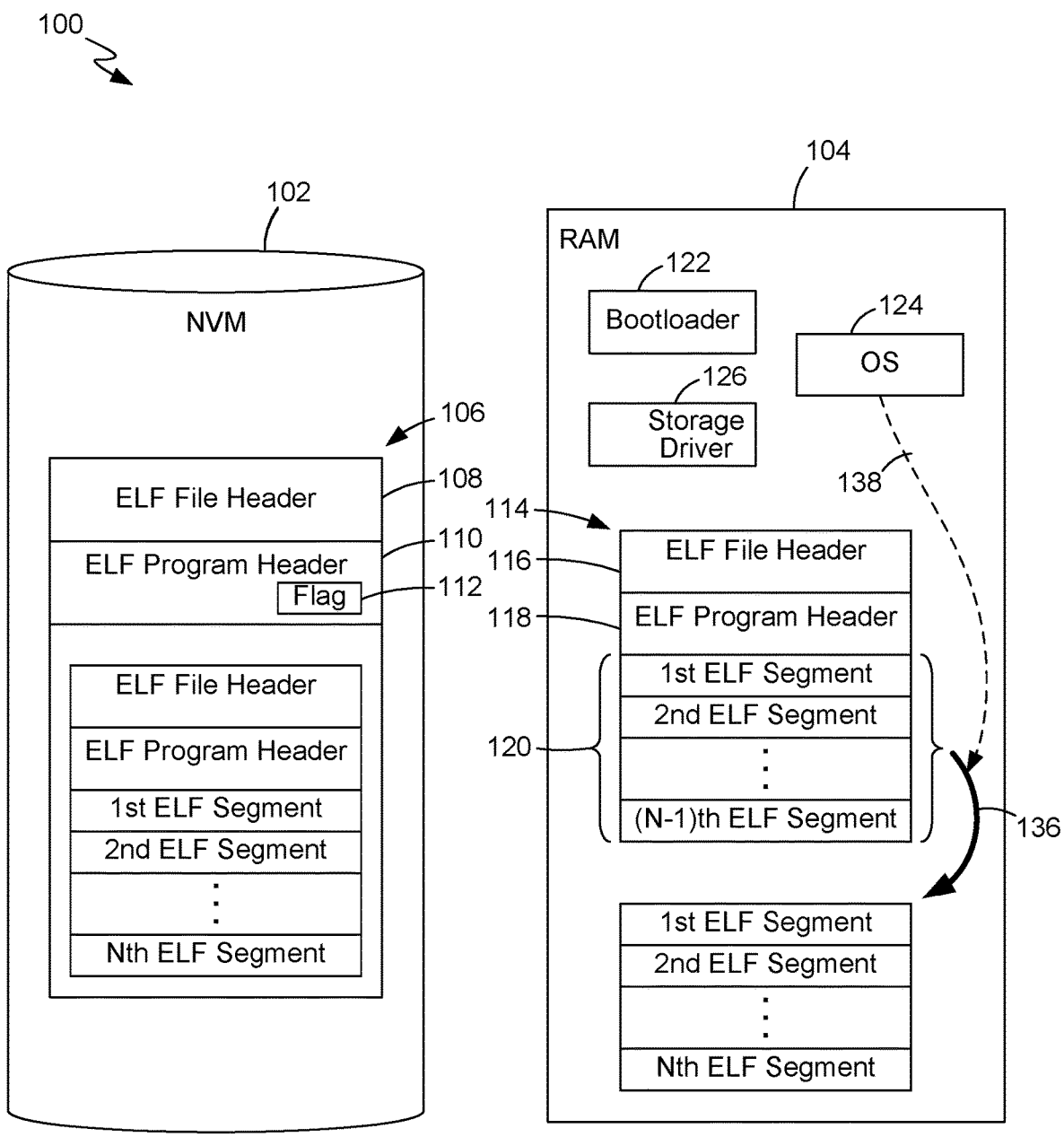
FIG. 3 is similar to FIG. 2, showing the system after file portions have been transferred from a first region of the RAM to a second region of the RAM, in accordance with exemplary embodiments.

As shown in FIG. 3, the operating system 124 may then read the inner file ELF File Header 116 in the inner file 114 stored in the RAM 104. The inner file ELF File Header 116 may include information identifying the location of the inner file ELF Program Header 118 in the inner file 114 stored in the RAM 104. The operating system 124 may be configured to use this location information to read the inner file ELF Program Header 118.

The inner file ELF Program Header 118 may include information identifying the location of the inner file ELF data segments 120 stored in the RAM 104. The operating system 124 may be configured to use this location information to read the inner file ELF data segments 120 in the inner file 114 stored in the RAM 104. In reading the inner file ELF data segments 120, the operating system 124 may be configured to transfer the inner file ELF data segments 120 from a first region of the RAM 104 to a second region of the RAM 104. This transferring of the inner file ELF data segments 120 is conceptually indicated by the arrow 136. Control of the transfer by the operating system 124 is conceptually indicated by a broken-line arrow 138. In an alternative example (not shown), an operating system may be configured to transfer the inner file ELF data segments from the RAM to another RAM. The second region of the RAM 104 (or alternatively, a region of another RAM) may be a region from which the software can be executed. Execution of this software may be a further stage or step in the process of booting the computing device, where loading the software from the NVM 102 to the first region of the RAM 104 is an earlier stage or step in the booting process. In still other examples, the transfer of ELF data segments may be controlled by hardware (e.g., a finite state machine, etc.) rather than the operating system 124.

Note that the bootloader 122, or the bootloader 122 in combination with the storage driver 126, may access the NVM 102 a small number of times (i.e., generally substantially fewer times than the number of ELF data segments 120) to load the inner file 114 into the RAM 104. Then, the operating system 124 may transfer all of the ELF data segments 120 from the first region of the RAM 104 to the second region of the RAM 104 (or alternatively, to a region of another RAM) without further accessing the NVM 102. Such a RAM-based data transfer may be substantially faster than a transfer of the same number of ELF data segments 120 from the NVM 102 to the RAM 104, as each access of the NVM 102 by the bootloader 122 may take substantially more time than each access of the RAM 104 by the operating system 124. In the exemplary system 100, this speed efficiency may enable faster booting than in an alternative system (not shown) in which a bootloader were to access the NVM a larger number of times.

Figure 4:
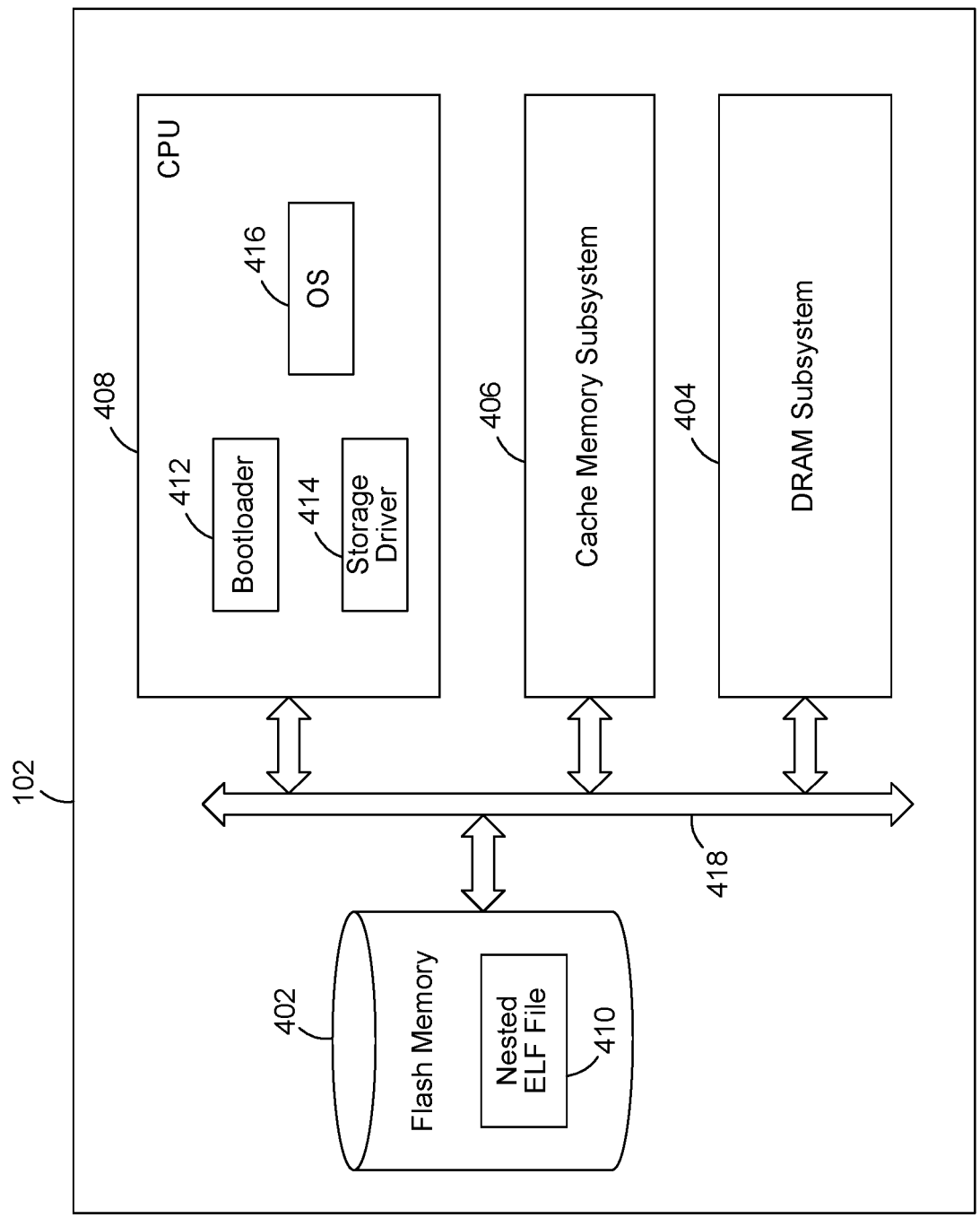
FIG. 4 is a block diagram of a computing device having a non-volatile storage medium and a RAM, in accordance with exemplary embodiments.

As shown in FIG. 4, a computing device 400 may include a flash memory 402 or other NVM, a DRAM subsystem 404 or other main memory subsystem, a cache memory subsystem 406, and a central processing unit ("CPU") 408 or other processor or processing subsystem. A nested ELF file 410 may be stored in the flash memory 402. The CPU 408 may be configured in execution by operation of various software components, which may include a bootloader 412, a storage driver 414 (e.g., flash driver), and an operating system 416. The flash memory 402, DRAM subsystem 404, cache memory subsystem 406, and CPU 408 may be coupled or interconnected by one or more data busses 418 or other data communication interconnects. The flash memory 402 and DRAM subsystem 404 may be examples of the above-described NVM 102 and RAM 104 (FIGS. 1-3).

The nested ELF file 410 may be similar to the above-described outer file 106 and inner file 114 (not separately shown in FIG. 4). The bootloader 412, storage driver 414, and operating system 416 may be similar to the above-described bootloader 122, storage driver 126, and operating system 124, respectively. For purposes of clarity, the foregoing software components are conceptually depicted in FIG. 4 as configuring the CPU 408 in execution, and are conceptually depicted in FIGS. 1-3 as stored in or residing in the RAM 104. Regardless of how they may be depicted, as understood by one of ordinary skill in the art, such software components may be stored in or reside in any storage medium and be transferred for execution among storage media and processors in accordance with well-understood computing principles, e.g., in portions, on an as-needed basis, etc.

Figure 5:
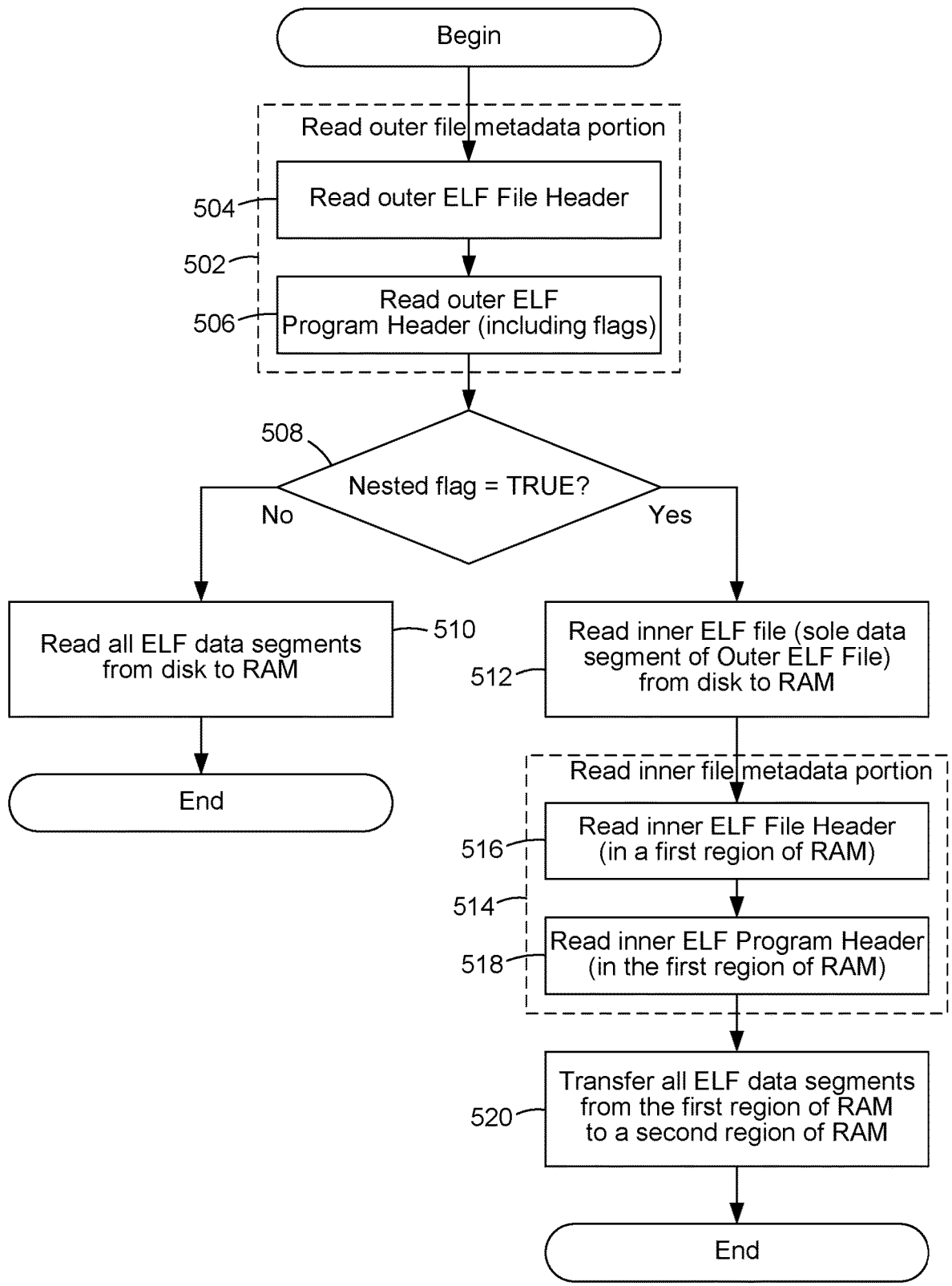
FIG. 5 is a flow diagram illustrating a method for loading data in a computing device from a non-volatile storage medium, in accordance with exemplary embodiments.

In FIG. 5 a method 500 for loading data in a computing device from a non-volatile storage medium or "NVM" is illustrated in block diagram form. As indicated by block 502, the method 500 may include reading an outer file metadata portion from an outer file stored on the NVM into the RAM. The outer file metadata portion may, for example, include an ELF File Header and an ELF Program Header, which may be read together in one access of the NVM or in separate accesses, as indicated by blocks 504 and 506, respectively. The outer file may include the outer file metadata portion and an outer file data portion, as described above.

The outer file metadata portion may include a flag. As indicated by block 508, it may be determined whether the state of the flag is true or false. A true state may indicate that the outer file is nested, i.e., contains an inner file, while a false state may indicated that the outer file is not nested, i.e., does not contain an inner file. If it is determined that the outer file is not nested, then the method 500 may continue at block 510.

As indicated by block 510, in the case that the outer file is not nested, the method 500 may include reading the outer file data portion from the outer file on the storage medium into the RAM. The outer file metadata portion (e.g., ELF Program Header), may be used to determine the location of the outer file data portion in the outer file. In the case that the outer file is not nested, reading the outer file data portion may comprise reading multiple data segments (e.g., ELF data segments).

As indicated by block 512, in the case that the outer file is nested, the method 500 may include reading the outer file data portion from the outer file on the storage medium into the RAM. Although this operation is similar to block 510, in the case that the outer file is nested, the outer file data portion comprises an inner file, which may be the sole data segment of the outer file. That is, in the case that the outer file is nested, reading the outer file may comprise reading only one data segment: the inner file.

A processor, as configured by execution of a bootloader or a bootloader in combination with other software components, such as a storage driver, may serve as a means for performing the functions described above with regard to blocks 502-512.

As indicated by block 514, the method 500 may include reading the inner file metadata portion from the RAM. The inner file metadata portion may, for example, include an ELF File Header and an ELF Program Header, which may be read together in one access of the RAM or in separate accesses, as indicated by blocks 516 and 518, respectively. The inner file may include the inner file metadata portion and an inner file data portion, as described above.

As indicated by block 520, the method 500 may include reading the inner file data portion from the RAM. The inner file metadata portion may be used to determine the location of the inner file data portion in the RAM. Reading the inner file data portion may comprise reading multiple data segments (e.g., ELF data segments). Reading the inner file data portion may comprise transferring the multiple data segments from a first region of RAM to a second region of RAM.

Although not shown in FIG. 5, the method may further include executing the executable file or files represented by the data segments in the RAM (e.g., as part of a boot process). A processor, as configured by execution of a bootloader or a bootloader in combination with other software components, such as a storage driver, may serve as a means for performing the functions described above with regard to blocks 514-520.

Figure 6:
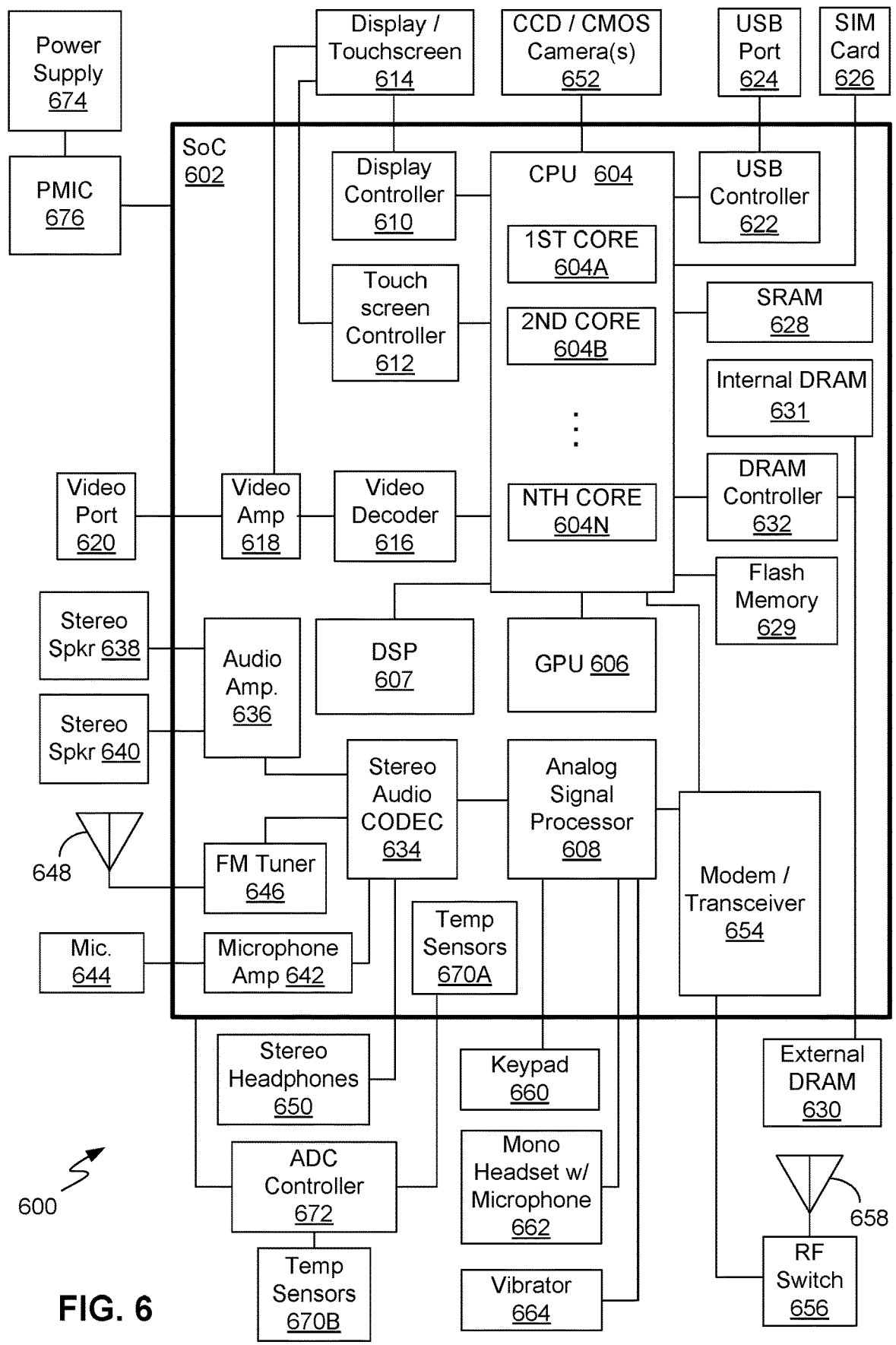
FIG. 6 is block diagram of a portable computing device, in accordance with exemplary embodiments.

FIG. 6 illustrates an example of a portable computing device ("PCD") 600, in which exemplary embodiments of systems, methods, computer-readable media, and other examples of loading data in a computing device from a non-volatile storage medium may be provided. The PCD 600 may be, for example, a laptop or palmtop computer, cellular telephone or smartphone, personal digital assistant, navigation device, smartbook, portable game console, satellite telephone, etc. For purposes of clarity, some data buses, interconnects, signals, etc., are not shown in FIG. 6.

The PCD 600 may include an SoC 602. The SoC 602 may include a central processing unit ("CPU") 604, a graphics processing unit ("GPU") 606, a digital signal processor ("DSP") 607, an analog signal processor 608, a modem/modem subsystem 654, or other processors. The CPU 604 may include one or more CPU cores, such as a first CPU core 604A, a second CPU core 604B, etc., through an Nth CPU core 604N.

A display controller 610 and a touch-screen controller 612 may be coupled to the CPU 604. A touchscreen display 614 external to the SoC 602 may be coupled to the display controller 610 and the touch-screen controller 612. The PCD 600 may further include a video decoder 616 coupled to the CPU 604. A video amplifier 618 may be coupled to the video decoder 616 and the touchscreen display 614. A video port 620 may be coupled to the video amplifier 618. A universal serial bus ("USB") controller 622 may also be coupled to CPU 604, and a USB port 624 may be coupled to the USB controller 622. A subscriber identity module ("SIM") card 626 may also be coupled to the CPU 604.

One or more memories may be coupled to the CPU 604. The one or more memories may include both volatile and non-volatile memories or NVMs. Examples of volatile memories include static random access memory ("SRAM") 628 and dynamic random access memories ("DRAMs") 630 and 631. Such memories may be external to the SoC 602, such as the DRAM 630, or internal to the SoC 602, such as the DRAM 631. A DRAM controller 632 coupled to the CPU 604 may control the writing of data to, and reading of data from, the DRAMs 630 and 631.

A flash memory 629 may be coupled to the CPU 604 and may an example of an the above-described NVM 102 (FIGS. 1-3). Although the flash memory 629 is internal to the SoC 602 in the illustrated example, in other examples such a flash memory may be external to the SoC. The DRAM 630 or 631, or the SRAM 628 may be an example of the above-described RAM 104 (FIGS. 1-3). Cache memory similar to the cache memory 406 (FIG. 4) is not shown in FIG. 6 but may also be included.

A stereo audio CODEC 634 may be coupled to the analog signal processor 608. Further, an audio amplifier 636 may be coupled to the stereo audio CODEC 634. First and second stereo speakers 638 and 640, respectively, may be coupled to the audio amplifier 636. In addition, a microphone amplifier 642 may be coupled to the stereo audio CODEC 634, and a microphone 644 may be coupled to the microphone amplifier 642. A frequency modulation ("FM") radio tuner 646 may be coupled to the stereo audio CODEC 634. An FM antenna 648 may be coupled to the FM radio tuner 646. Further, stereo headphones 650 may be coupled to the stereo audio CODEC 634. Other devices that may be coupled to the CPU 604 include one or more digital (e.g., CCD or CMOS) cameras 652.

The modem or RF transceiver 654 may be coupled to the analog signal processor 608 and the CPU 604. An RF switch 656 may be coupled to the RF transceiver 654 and an RF antenna 658. In addition, a keypad 660, a mono headset with a microphone 662, and a vibrator device 664 may be coupled to the analog signal processor 608.

The SoC 602 may have one or more internal or on-chip thermal sensors 670A and may be coupled to one or more external or off-chip thermal sensors 670B. An analog-to-digital converter controller 672 may convert voltage drops produced by the thermal sensors 670A and 670B to digital signals. A power supply 674 and a power management integrated circuit ("PMIC") 676 may supply power to the SoC 602.

Firmware or software may be stored in any of the above-described memories, such as the DRAM 630 or 631, SRAM 628, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A method for loading data in a computing device from a non-volatile storage medium, comprising:
   reading, by a processor, an outer file metadata portion from an outer file on the storage medium into random access memory (RAM), the outer file comprising the outer file metadata portion and an outer file data portion;
   reading, by the processor, the outer file data portion from the outer file on the storage medium into the RAM based on the outer file metadata portion, the outer file data portion comprising an inner file, the inner file comprising an inner file metadata portion and an inner file data portion;
   reading, by the processor, the inner file metadata portion from the inner file in the RAM; and
   reading, by the processor, the inner file data portion from the inner file in the RAM based on the inner file metadata portion.

2. The method of clause 1, wherein the method is performed during booting of the computing device.

3. The method of clause 1 or 2, wherein reading the outer file metadata portion comprises:
   reading an outer file first metadata portion indicating a location of an outer file second metadata portion; and
   reading the outer file second metadata portion based on the location indicated by the outer file first metadata portion, the outer file second metadata portion indicating a location of the outer file data portion.

4. The method of any of clauses 1-3, wherein the file has a format comprising an Executable and Linkable Format (ELF).

5. The method of any of clauses 1-4, wherein reading the inner file data portion comprises reading data from a first region of the RAM and storing the data in a second region of the RAM.

6. The method of any of clauses 1-5, wherein the outer file data portion consists solely of the inner file.

7. The method of any of clauses 1-6, wherein the inner file data portion comprises a plurality of data segments.

8. The method of any of clauses 1-7, further comprising:
   reading a flag in the outer file metadata;

determining whether the flag has a first state indicating a nested file structure or a second state indicating a non-nested file structure;

when the flag has the first state indicating the nested file structure, reading the outer file data portion comprises reading the inner file; and when the flag has the second state indicating the non-nested file structure, reading the outer file data portion comprises reading a plurality of data segments from the outer file data portion on the storage medium into the RAM.

9. A system for loading data in a computing device, comprising:

a non-volatile storage medium;

a random access memory (RAM); and a processor configured to load the data into the RAM, comprising the processor being configured to:

read an outer file metadata portion from an outer file on the storage medium into RAM, the outer file comprising the outer file metadata portion and an outer file data portion;

read the outer file data portion from the outer file on the storage medium into the RAM based on the outer file metadata portion, the outer file data portion comprising an inner file, the inner file comprising an inner file metadata portion and an inner file data portion;

read the inner file metadata portion from the inner file in the RAM; and read the inner file data portion from the inner file in the RAM based on the inner file metadata portion.

10. The system of clause 9, wherein the processor is configured to load the data into the RAM during booting of the computing device.

11. The system of clause 9 or 10, wherein the processor being configured to load the data into the RAM comprises the processor being configured to:

read an outer file first metadata portion indicating a location of an outer file second metadata portion; and read the outer file second metadata portion based on the location indicated by the outer file first metadata portion, the outer file second metadata portion indicating a location of the outer file data portion.

12. The system of any of clauses 9-11, wherein the file has a format comprising an Executable and Linkable Format (ELF).

13. The system of any of clauses 9-12, wherein processor being configured to read the inner file data portion comprises the processor being configured to read data from a first region of the RAM and store the data in a second region of the RAM.

14. The system of any of clauses 9-13, wherein the outer file data portion consists solely of the inner file.

15. The system of any of clauses 9-14, wherein the inner file data portion comprises a plurality of data segments.

16. The system of any of clauses 9-15, wherein the processor is configured to:

read a flag in the outer file metadata;

determine whether the flag has a first state indicating a nested file structure or a second state indicating a non-nested file structure;

when the flag has the first state indicating the nested file structure, the processor being configured to read the outer file data portion comprises the processor being configured to read the inner file; and when the flag has the second state indicating the non-nested file structure, the processor being configured to read the outer file data portion comprises the processor being configured to read a plurality of data segments from the outer file data portion on the storage medium into the RAM.

17. A system for loading data in a computing device from a non-volatile storage medium, comprising:

means for reading an outer file metadata portion from an outer file on the storage medium into random access memory (RAM), the outer file comprising the outer file metadata portion and an outer file data portion;

means for reading the outer file data portion from the outer file on the storage medium into the RAM based on the outer file metadata portion, the outer file data portion comprising an inner file, the inner file comprising an inner file metadata portion and an inner file data portion;

means for reading the inner file metadata portion from the inner file in the RAM; and means for reading the inner file data portion from the inner file in the RAM based on the inner file metadata portion.

18. The system of clause 17, wherein the means for reading an outer file metadata portion, the means for reading the outer file data portion, the means for reading the inner file metadata portion, and the means for reading the inner file data portion are further for operating during booting of the computing device.

19. The system of clause 17 or 18, wherein the means for reading the outer file metadata portion comprises:

means for reading an outer file first metadata portion indicating a location of an outer file second metadata portion; and means for reading the outer file second metadata portion based on the location indicated by the outer file first metadata portion, the outer file second metadata portion indicating a location of the outer file data portion.

20. The system of any of clauses 17-19, wherein the file has a format comprising an Executable and Linkable Format (ELF).

21. The system of any of clauses 17-20, wherein reading the inner file data portion comprises reading data from a first region of the RAM and storing the data in a second region of the RAM.

22. The system of any of clauses 17-21, wherein the outer file data portion consists solely of the inner file.

23. The system of any of clauses 17-22, wherein the inner file data portion comprises a plurality of data segments.

24. The system of any of clauses 17-23, further comprising:

means for reading a flag in the outer file metadata;

means for determining whether the flag has a first state indicating a nested file structure or a second state indicating a non-nested file structure;

wherein the means for reading the outer file data portion comprises means for reading the inner file when the flag has the first state indicating the nested file structure; and wherein the means for reading the outer file data portion comprises means for reading a plurality of data segments from the outer file data portion on the storage medium into the RAM when the flag has the second state indicating the non-nested file structure.

25. A computer-readable medium for loading data in a computing device from a non-volatile storage medium, the computer-readable medium comprising a non-transitory computer-readable medium having instructions stored thereon in computer-executable form, the instructions when executed by a processing system of the computing device configuring the processing system to:
  read an outer file metadata portion from an outer file on the storage medium into random access memory (RAM), the outer file comprising the outer file metadata portion and an outer file data portion;
  read the outer file data portion from the outer file on the storage medium into the RAM based on the outer file metadata portion, the outer file data portion comprising an inner file, the inner file comprising an inner file metadata portion and an inner file data portion;
  read the inner file metadata portion from the inner file in the RAM; and
  read the inner file data portion from the inner file in the RAM based on the inner file metadata portion.

26. The computer-readable medium of clause 25, wherein the processing system is configured to read the outer file metadata portion, read the outer file data portion, read the inner file metadata portion, and read the inner file metadata portion during booting of the computing device.

27. The computer-readable medium of clause 25 or 26, wherein the file has a format comprising an Executable and Linkable Format (ELF).

28. The computer-readable medium of any of clauses 25-27, wherein the processing system being configured to read the inner file data portion comprises the processing system being configured to read data from a first region of the RAM and storing the data in a second region of the RAM.

29. The computer-readable medium of any of clauses 25-28, wherein the outer file data portion consists solely of the inner file.

30. The computer-readable medium of any of clauses 25-29, wherein the inner file data portion comprises a plurality of data segments.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for loading data in random access memory (RAM) of a computing device from a non-volatile storage medium, comprising:
  reading, by a bootloader running on a processor of the computing device during booting of the computing device, an outer file metadata portion from an outer file on the non-volatile storage medium, the outer file comprising the outer file metadata portion and an outer file data portion;
  reading, by the bootloader running on the processor of the computing device, the outer file data portion from the outer file on the non-volatile storage medium based on the outer file metadata portion, the outer file data portion comprising an inner file, the inner file comprising an inner file metadata portion and an inner file data portion;
  reading, by the bootloader running on the processor of the computing device, the inner file metadata portion from the inner file on the non-volatile storage medium;
  reading, by the bootloader running on the processor of the computing device, the inner file data portion from the inner file on the non-volatile storage medium based on the inner file metadata portion;
  transferring, by the bootloader running on the processor of the computing device, the inner file from the non-volatile storage medium to a first region in the RAM;
  reading, by an operating system running on the processor of the computing device, the inner file stored in the first region of the RAM; and
  transferring, by the operating system running on the processor of the computing device, one or more segments of executable code from the inner file to a second region in the RAM, such that the executable code in the second region of the RAM is later executed by the processor of the computing device.

2. The method of claim 1, wherein reading the outer file metadata portion comprises:
  reading an outer file first metadata portion indicating a location of an outer file second metadata portion; and
  reading the outer file second metadata portion based on the location indicated by the outer file first metadata portion, the outer file second metadata portion indicating a location of the outer file data portion.

3. The method of claim 1, wherein the file has a format comprising an Executable and Linkable Format (ELF).

4. The method of claim 1, wherein the outer file data portion consists solely of the inner file.

5. The method of claim 1, wherein the inner file data portion comprises a plurality of data segments.

6. The method of claim 1, further comprising:
  reading a flag in the outer file metadata;
  determining whether the flag has a first state indicating a nested file structure or a second state indicating a non-nested file structure;
  when the flag has the first state indicating the nested file structure, reading the outer file data portion comprises reading the inner file; and
  when the flag has the second state indicating the non-nested file structure, reading the outer file data portion comprises reading a plurality of data segments from the outer file data portion on the storage medium into the RAM.

7. A system for loading data in a computing device, comprising:
  a non-volatile storage medium;
  a random access memory (RAM); and
  a processor running a bootloader configured to load the data into the RAM, comprising the bootloader during booting of the computing device being configured to:
    read an outer file metadata portion from an outer file on the non-volatile storage medium, the outer file comprising the outer file metadata portion and an outer file data portion;
    read the outer file data portion from the outer file on the non-volatile storage medium based on the outer file metadata portion, the outer file data portion comprising an inner file, the inner file comprising an inner file metadata portion and an inner file data portion;
    read the inner file metadata portion from the inner file on the non-volatile storage medium;
    read the inner file data portion from the inner file on the non-volatile storage medium based on the inner file metadata portion;
    transferring the inner file from the non-volatile storage medium to a first region in the RAM; and
  the processor running an operating system, wherein the operating system is configured to:
    read the inner file stored in the first region of the RAM; and
    transfer one or more segments of executable code from the inner file to a second region in the RAM, such that the executable code in the second region on the RAM is later executed by the processor of the computing device.

8. The system of claim 7, wherein the processor being configured to load the data into the RAM comprises the processor running the bootloader being configured to:
read an outer file first metadata portion indicating a location of an outer file second metadata portion; and
read the outer file second metadata portion based on the location indicated by the outer file first metadata portion, the outer file second metadata portion indicating a location of the outer file data portion.

9. The system of claim 7, wherein the file has a format comprising an Executable and Linkable Format (ELF).

10. The system of claim 7, wherein the outer file data portion consists solely of the inner file.

11. The system of claim 7, wherein the inner file data portion comprises a plurality of data segments.

12. The system of claim 7, wherein the processor running the bootloader is configured to:
read a flag in the outer file metadata;
determine whether the flag has a first state indicating a nested file structure or a second state indicating a non-nested file structure;
when the flag has the first state indicating the nested file structure, the processor being configured to read the outer file data portion comprises the processor being configured to read the inner file; and
when the flag has the second state indicating the non-nested file structure, the processor being configured to read the outer file data portion comprises the processor being configured to read a plurality of data segments from the outer file data portion on the storage medium into the RAM.

13. A computer-readable medium for loading data in a computing device from a non-volatile storage medium into random access memory (RAM), the computer-readable medium comprising a non-transitory computer-readable medium having instructions stored thereon in computer-executable form, the instructions when executed by a processing system of the computing device configuring the processing system to:
cause a bootloader during booting of the computing device to read an outer file metadata portion from an outer file on the non-volatile storage medium, the outer file comprising the outer file metadata portion and an outer file data portion;
cause the bootloader to read the outer file data portion from the outer file on the non-volatile storage medium based on the outer file metadata portion, the outer file data portion comprising an inner file, the inner file comprising an inner file metadata portion and an inner file data portion;
cause the bootloader to read the inner file metadata portion from the inner file on the non-volatile storage medium;
cause the bootloader to read the inner file data portion from the inner file on the non-volatile storage medium based on the inner file metadata portion;
cause the bootloader to transfer the inner file from the non-volatile storage medium to a first region in the RAM;
cause an operating system to read the inner file stored in the first region of the RAM; and
cause the operating system to transfer one or more segments of executable code from the inner file to a second region in the RAM, such that the executable code in the second region on the RAM is later executed by the processor of the computing device.

14. The computer-readable medium of claim 13, wherein the file has a format comprising an Executable and Linkable Format (ELF).

15. The computer-readable medium of claim 13, wherein the outer file data portion consists solely of the inner file.

16. The computer-readable medium of claim 13, wherein the inner file data portion comprises a plurality of data segments.

* * * * *